United States Patent
Frechette

(10) Patent No.: US 10,121,008 B1
(45) Date of Patent: Nov. 6, 2018

(54) METHOD AND PROCESS FOR AUTOMATIC DISCOVERY OF ZERO-DAY VULNERABILITIES AND EXPOITS WITHOUT SOURCE CODE ACCESS

(71) Applicant: Stephen Patrick Frechette, Newton, MA (US)

(72) Inventor: Stephen Patrick Frechette, Newton, MA (US)

(*) Notice: Subject to any disclaimer, the term of this patent is extended or adjusted under 35 U.S.C. 154(b) by 0 days.

(21) Appl. No.: 14/218,913

(22) Filed: Mar. 18, 2014

Related U.S. Application Data

(60) Provisional application No. 61/852,515, filed on Mar. 18, 2013.

(51) Int. Cl.
*G06F 21/00* (2013.01)
*G06F 21/57* (2013.01)
*H04L 29/06* (2006.01)

(52) U.S. Cl.
CPC ........ *G06F 21/577* (2013.01); *H04L 63/1433* (2013.01)

(58) Field of Classification Search
CPC ........ G06F 21/57; G06F 21/577; G06F 21/52; G06F 21/563; G06F 21/00
See application file for complete search history.

(56) References Cited

U.S. PATENT DOCUMENTS

| | | | | |
|---|---|---|---|---|
| 7,788,723 | B2 * | 8/2010 | Huddleston | G06F 21/554 713/188 |
| 8,413,237 | B2 * | 4/2013 | O'Rourke | H04L 63/1433 726/23 |
| 8,495,748 | B2 * | 7/2013 | Das | G06F 21/577 713/194 |
| 9,135,405 | B2 * | 9/2015 | Brumley | G06F 21/00 |
| 9,363,279 | B2 * | 6/2016 | Evrard | H04L 63/1416 |
| 2005/0049962 | A1 * | 3/2005 | Porter | G06Q 40/025 705/38 |
| 2012/0317647 | A1 * | 12/2012 | Brumley | G06F 21/00 726/25 |
| 2014/0337971 | A1 * | 11/2014 | Casassa Mont | G06F 21/552 726/22 |

OTHER PUBLICATIONS

"Measuring Security Risk of Networks Using Attack Graphs", Steven Noel et al., International Journal of Next-Generation Computing, vol. 1, No. 1, Jul. 2010.*

* cited by examiner

*Primary Examiner* — Linglan E Edwards
(74) *Attorney, Agent, or Firm* — Mu P.C.

(57) ABSTRACT

An invention that enables an automatic discovery of Vulnerabilities in software that consists of compiled and linked machine code. Once the vulnerability, i.e., a set of values in a file or memory or network packet that causes unintended execution of commands, is discovered, the invention also automatically creates a set of commands to execute to enable a user to execute unauthorized commands. Through the employment of random input file generation that follows a set of constraints, and symbolic execution that creates solutions in the form of data input sets, which results in the CPU's program counter to execute malicious code, the invention creates novel software vulnerabilities and exploits.

10 Claims, 8 Drawing Sheets

METHOD AND PROCESS FOR AUTOMATIC DISCOVERY OF ZERO-DAY VULNERABILITIES AND EXPOITS WITHOUT SOURCE CODE ACCESS

CROSS-REFERENCE TO RELATED APPLICATIONS

This application claims the benefit of U.S. Provisional Patent Application No. 61/852,515 filed on Mar. 18, 2013, which is hereby incorporated herein by reference in its entirety.

BACKGROUND OF THE INVENTION

1. Field of the Invention

The invention is a method and process that enables an automatic discovery of Vulnerabilities in software that consists of compiled and linked machine code. Once the Vulnerability, i.e., a set of values in a file or memory or network packet that causes unintended execution of commands, is discovered, the invention also automatically creates a set of commands to execute to enable a user to execute unauthorized commands.

The problem the invention solves is how gain unauthorized access of a processor via the execution of a dataset constructed for that purpose?

The problem is solved in a twofold manner, firstly the set of commands that allow for unauthorized commands to be executed, by putting the state of the computer in a Vulnerable state is discovered, these sets of commands or data are referred to as a Vulnerability. Second, once the victim software is in a Vulnerable state an additional set of commands is discovered or created that may be executed to cause the computer to perform an unauthorized action that the creators of the original software never intended to be permitted.

An inventive step of this invention is that all information pertaining to the victim software of the attack is determined via Monte Carlo simulations that create input datasets, and the use of Symbolic execution to discover and create both vulnerabilities and exploits via analysis of computer memory, or CPU register values. The inventive step allows for automatic software Vulnerability detection and Exploit generation without access to the program's source code.

2. Description of Prior Art

In prior art methods and systems that enable automatic discovery of Vulnerabilities and generation of source code requires access to the source code of the victimized software application. The presented invention differs from the previously mentioned prior art in many ways, including that fact that that the source code is not required. The invention also differs from prior art in that it employs Monte Carlo simulations that create random datasets that are employed to discover Vulnerabilities in the victim software.

BRIEF SUMMARY OF THE INVENTION

The presented invention is a method and system for the automatic discovery of Vulnerabilities and automatic generation of an Exploit.

Additionally, the presented invention differs from previous art in that it does not require the use of or access to the victim software's source code.

In other aspects, the invention provides a system having features and advantages corresponding to those discussed above.

DETAILED DESCRIPTION OF THE INVENTION

Figure 1:
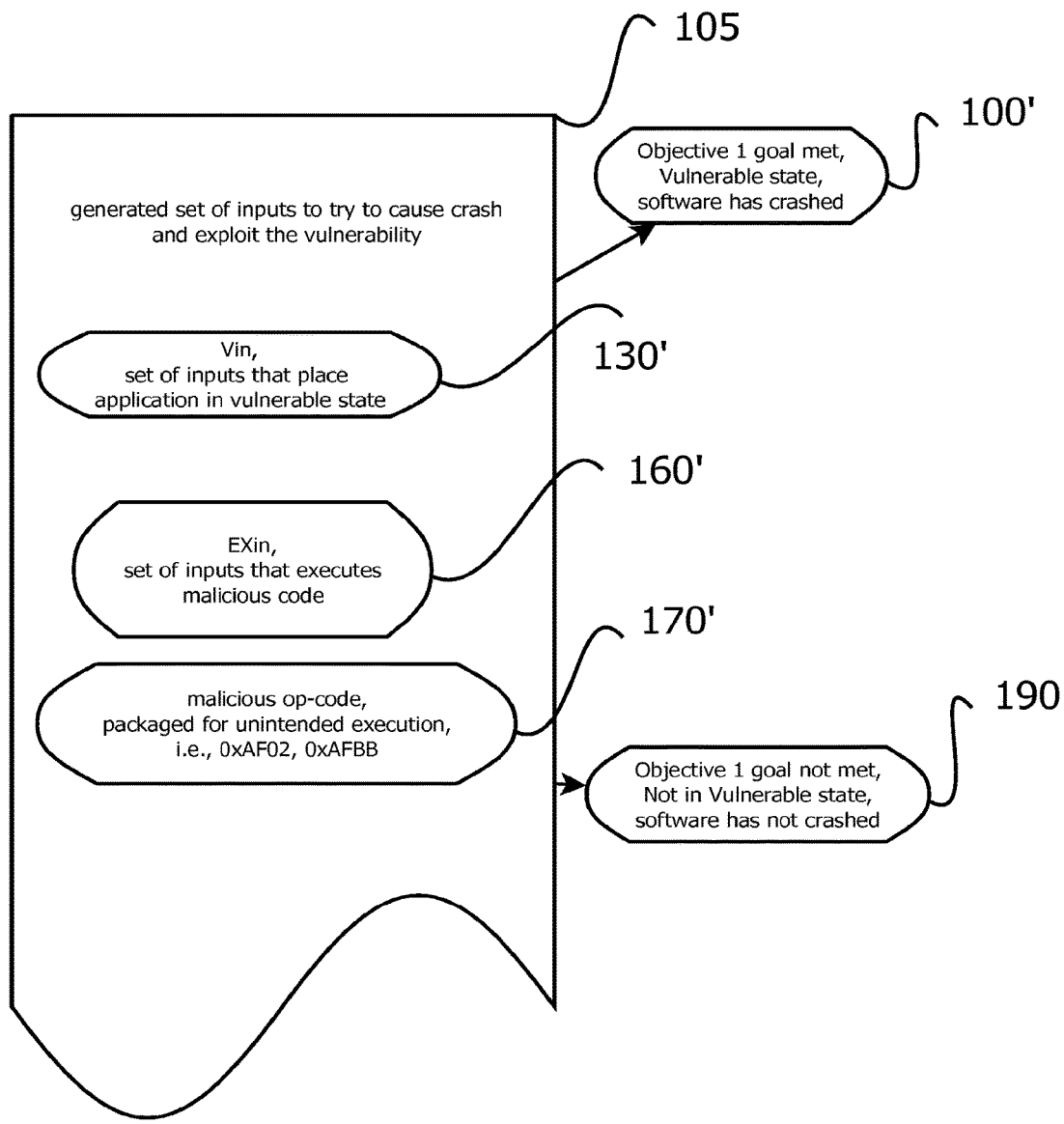
FIG. 1 is an overview of the input required to meet Objective 1, which is to put the victim software in the Vulnerable state.

The engineering problem definition for automatic Vulnerability generation and exploit generation follows:

Many software Vulnerabilities are found by private companies, who then keep the vulnerabilities a secret and sell them to the highest bidder. The invention is a method and process that automatically create inputs that would follow a coverage map and continuously attempt to crash a software application. In the event of an application crash, an exploitation would be attempted, in which the automated software framework would attempt to determine the program execution path that would allow for the injection of malicious code (this depends on the complexity and security of the software application that was crashed). Malicious software/code is often executed by gaining control of the program counter after a software crash, and inserting malicious code (usually in the form of assembly/machine code) into the execution path.

Zero-day exploitations are extremely valuable to many organizations for multiple reasons. Zero-day exploitations are exploitations otherwise unknown to the public. Since Zero-day exploitations are unknown, up until the point they are used, anti-virus software usually will not recognize the zero-day exploit. Once in possession of a powerful zero-day exploit an attacker could execute malicious code upon a victim's computer, thus allowing for an unauthorized intrusion into a private network, where the attacker could cause problems, steal information, or monitor activity. An advance exploit could even execute malicious code without resulting in a crash of the victim application, thus without any immediate warning signs.

The software framework is unique in that it only requires the binary executable in order to automatically find Vulnerabilities and generate Exploitations, i.e., the source code is not required.

The engineering problem definition follows:

The software framework is employed to create zero-day Exploits. A software Exploit is accomplished by causing the execution flow of the program to execute arbitrary code entered in one of the program's inputs. The overall goal is achieved by succeeding in reaching both Objective 1 and Objective 2. Objective 1 is to find a Vulnerability in the software, e.g., crash the software, the set of inputs that expose the Vulnerability is Vin. Objective 2 is to insert malicious code into the program execution path, EXin is responsible for that task. The next section provides an overview of the means to automatically achieve Objectives 1 and 2.

The Objective 1 is to find the Vulnerability, e.g., crash the software.

The software will be tested with a coverage map of Monte Carlo simulations using a large set of inputs generated with some random component values. Once a crash has occurred, the exact cause of the crash will be determined via a statistical analysis of the CPU register and computer memory contents. By analyzing these contents during both normal executions and crashes, inferences can be made as to the cause of the crash. These inferences are determined through any one of many traditional classification techniques.

Any pattern-based classification algorithm that is capable of execution with a high degree of parallelism, as is required for efficient processing of large datasets, will suffice for this task. Through the employment of the dynamic programming technique, execution with a high degree of parallelism is possible, because as with all problems that can be solved via the dynamic programming technique, it exhibits an optimal substructure and overlapping subproblems.

In review, a classification algorithms will be executed on a high-performance distributed computing environment to automatically identify the exact inputs that expose vulnerability in the software, if one exists.

The Objective 2 is to Exploit the Vulnerability, i.e., execute code inserted into the execution path by the attacker.

As oppose to Objective 1, in which only application inputs were analyzed, Objective 2 requires the analysis of both application inputs and information about the internals of the running application. A portion of these internals are viewable via an assembly level debugger, e.g., OllyDbg. Analysis via this type of debugger is most useful for cases when the source code is unavailable, which is assumed to be all cases for the method detailed in this proposal.

To achieve Objective 2 the following dynamic or probabilistic logic of action questions (Q1 and Q1a below) must be answered by the proposed automated framework. Symbolic logic is employed to define, and then answer the questions with a checker. The answer will be determined in a similar manner used in predicate calculus, in which answer extraction involves converting a refutation graph to a proof graph that contains a statement at the root that may be used as an answer.

Q1) If the application has entered state Q (which is well defined and classified as a Vulnerable state), what set of inputs (Zin) would allow for the execution of 300 bytes of malicious machine code?

Example Answer: Zin set of inputs would allow for execution of 300 bytes of malicious machine code, as seen in FIG. 1, with a probability of 40% with a one-sided confidence interval of 95%. Another potential answer is that it is not possible, i.e., there exists no set of inputs would cause the execution of 300 bytes of malicious code.

In order to answer this question it must be known what inputs (Zin) can find their way into either the registers or stack frames of State Q. Since state Q is only a single Vulnerable state of the victim application's system internals, this task is not too difficult because we are not interested in the state of the application's system internals during all runtime. The next question, Q1a, further refines exactly what is necessary to answer the question Q1.

Q1a) What set of x86-based instructions (EXin, which is a subset of Zin) would cause the malicious code (also a subset of Zin) to execute given the Registers or Stack frames of State Q?

In order to answer this question Dynamic fuzzy or Bayesian logic methods are required to adequately model the probabilistic nature of exploiting a Vulnerability. The logic implemented will have to be of the dynamic type, but also must be represented by assembly code syntax. Previous art has employs assembly code that carried logic to determine if there is a security flaw. The application's assembly source code and execution path must be represented by fuzzy logic or Bayesian logic and machine code that has been translated to carry logic. OllyDbg Debugger for low-level analysis of Operating System internals is employed for dynamic runtime application-level program analysis, it provides the ability for binary code analysis, thus proves very useful in cases where source is unavailable.

Next a proof checker program, or a type of answer extraction method, answers the question Q1a posed and provide the EXin set that would result in the execution of malicious code, with a reasonable probability, if that EXin set exists.

Figure 3:
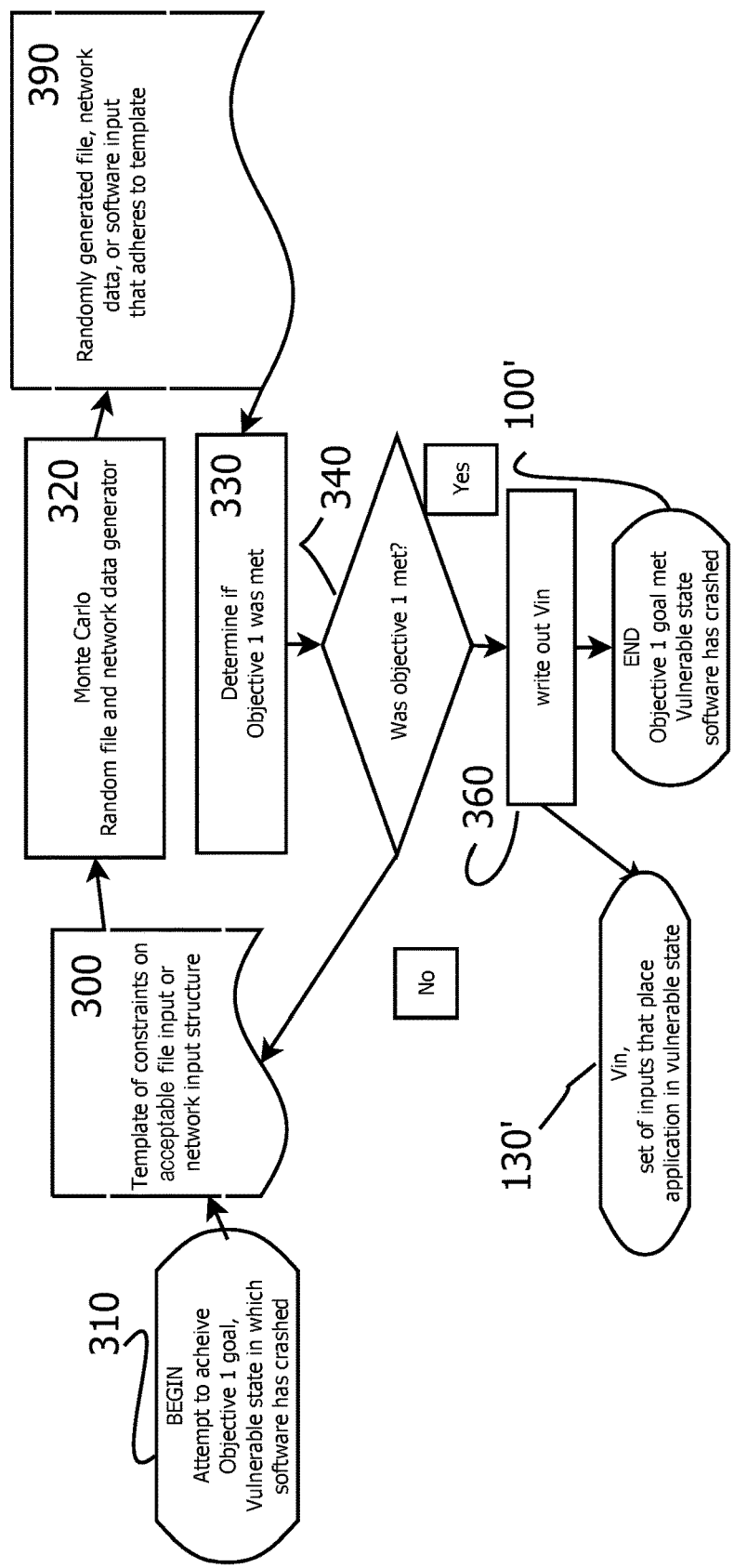
FIG. 3 is an illustration of the process in which the system attempts to achieve Objective 1.

The steps necessary to find Vin is provided in FIG. 3. As illustrated in FIG. 3, a Monte Carlo simulation generates random data, which adheres to a template, is generated in an attempt to crash the victim software, and thus achieve Objective 1. The Monte Carlo simulation method produces a random input for each different data type or variable or previously identified section of code, which is within the bounds of acceptable values. If any of these values can be attributed to a Vulnerability it is noted. Also, if any of these values is detected as appearing in CPU registers or memory locations which is unauthorized, it is also noted. Any randomly generated values that cause the CPU's program counter to execute unauthorized data is also noted, along with the unauthorized data that is executed.

FIG. 1 is an overview of the contents of an input file or set of program inputs that may crash the victim software via a Vulnerability and may contain a set of inputs that cause an Exploitation of the Vulnerability through the execution of malicious code. The set of inputs 105 is generated via a Monte Carlo generation of random inputs. The set of inputs 105 generated contain three components categories, the first one is Vin, which is a set of inputs that place the application in a Vulnerable state 130'. If the software has crashed, i.e., the CPU's program counter has reach an erroneous position/value, them the state of the system is set to Objective 1 goal met, which is the Vulnerable state 100'. Conversely, if Objective 1 is not met, the software is Not in the Vulnerable state 190. If the Vulnerable state is reached, then the inputs Vin 130' are saved.

Additional inputs components 105 categories include EXin, a set of inputs that executes malicious code 160', and malicious op-code 170' that is the payload of the exploit that is reachable through the Exploitation of a Vulnerability.

Figure 2:
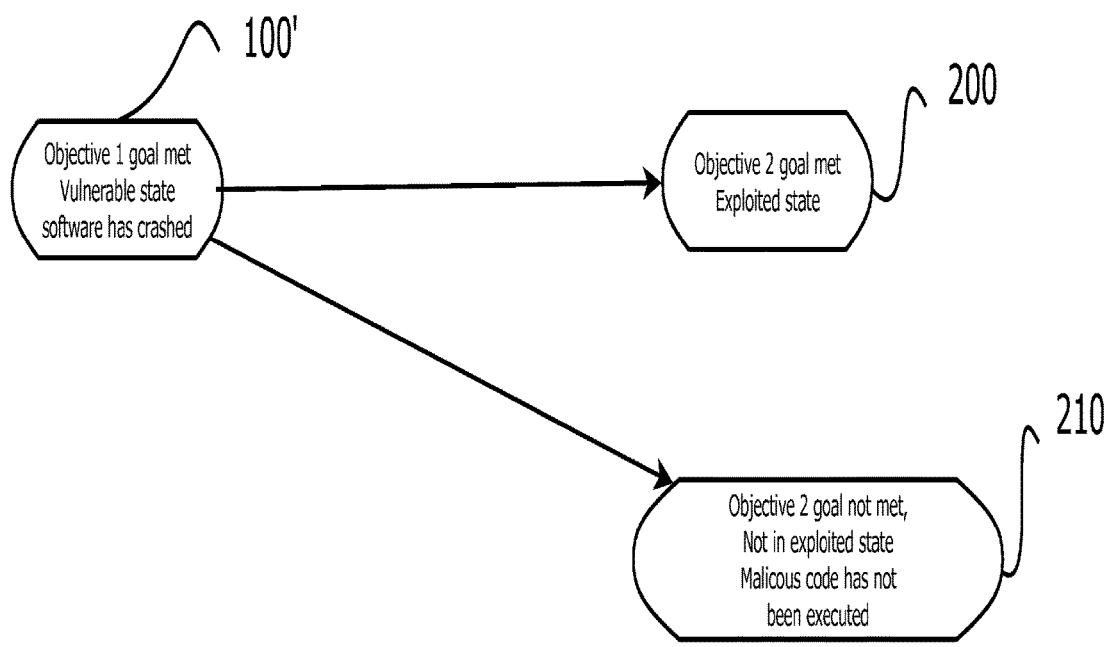
FIG. 2 is an illustration of the relationship between Objective 1 and Objective 2.

FIG. 2 illustrates the states and inputs related to Objective 2, in which the victim software has reached the Exploited state 200 through the execution of EXin. If Objective 1 has been met 100' and the victim software is in the Vulnerable state, then a set of inputs EXin may exist to cause the victim software to enter the Exploited state 200, thus Objective 2 has been met. If the victim software does not enter the Exploited state with the set of input EXin, then Objective 2 has not been met 210.

FIG. 3 illustrates the generation of inputs that adhere to a template, but contain random portions as generated by a Monte Carlo simulation, with the goal to reach Objective 1, in which the software application is in the Vulnerable state 100'. The process with the goal to achieve Objective 1 begins 310 by creating input data 320 in the form of a file or network data or generic input data that adheres to a template 300 of acceptable ranges for values and positions of the data. For example, a file for use with a word processor would contain header data and values at certain positions in the file, or a network packet would be required to contain certain headers.

Next the generated inputs 390 are executed or sent to the victim application to determine if those set of inputs could cause the software to enter the Vulnerable state. If it is determined that Objective 1 330 was not met 340 then a random number generator employed by the Monte Carlo simulator will generate another input Vin that adheres to any constraint imposed by the template 300. If it is determined that Objective 1 340 was met then Vin is written out 360 and saved as a file 130', and the process completes 100'.

Figure 4:
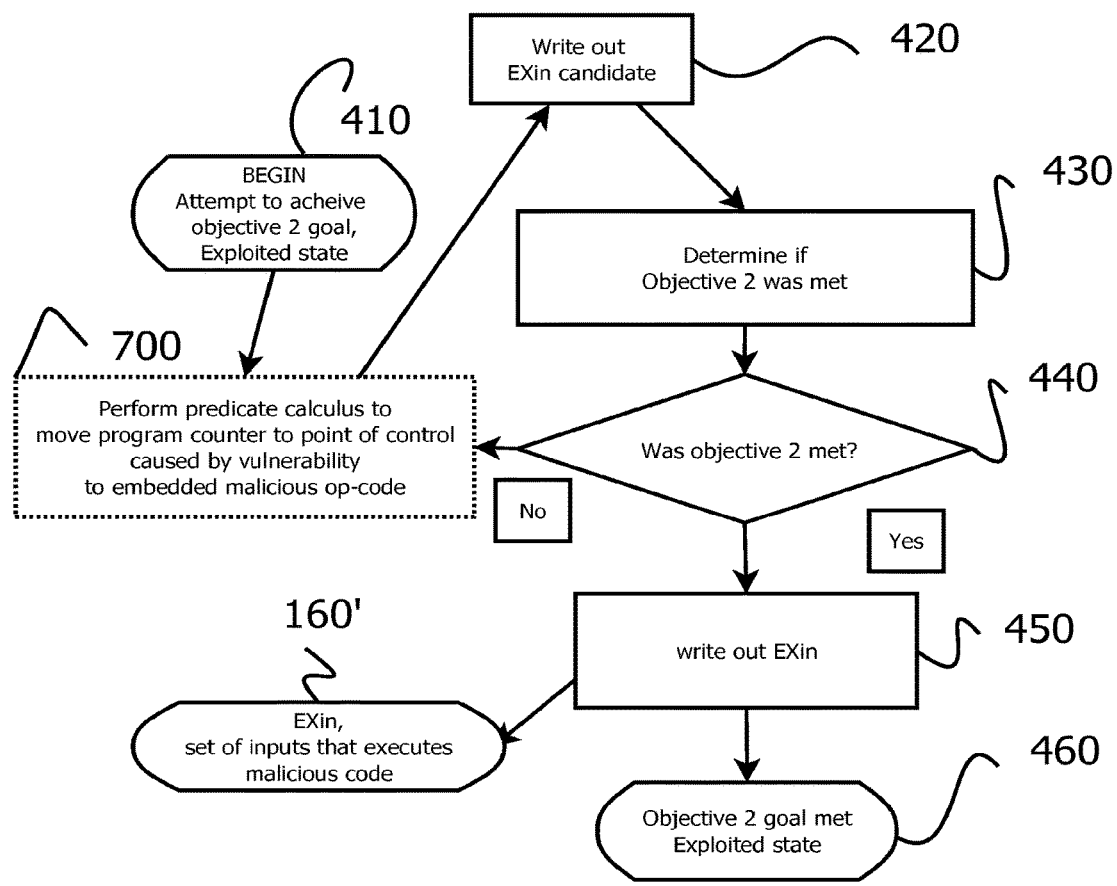
FIG. 4 is an illustration of the process in which the system attempts to achieve Objective 2.

FIG. 4 illustrates a process that supervises execution upon the victim's software, and also executes the predicate calculus or fuzzy logic or Bayesian logic or solves a problem that has been formulated by machine code that has been translated to carry logic. FIG. 4 illustrates the process 410 in which a symbolic execution engine 800 employs predicate calculus to create a set of instructions EXin 420, which is employed with the previously determined Vin to try to execute malicious code on the victim application. Through the execution of the victim application it is determined if Objective 2 was met 430. The next step determines if Objective 2 was met 440, and if it was then EXin is written out 450 and saved 160' and the process ends 460. If it is determined that the victim software is not in the exploited state, thus Objective 2 was not met, as performed by 440, then the process repeats when the symbolic execution engine 800 creates another EXin input candidate.

Figure 5:
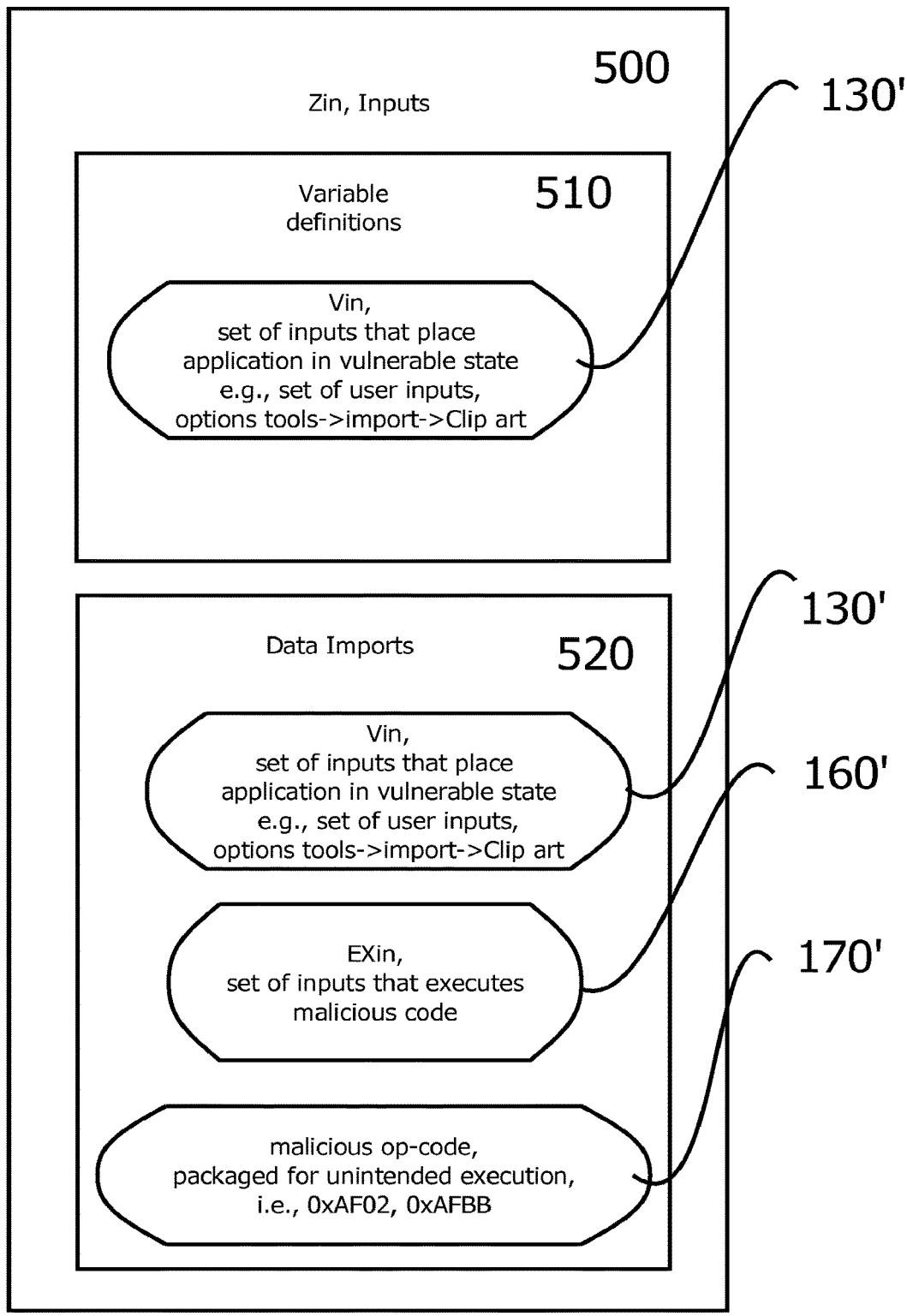
FIG. 5 is an illustration of the input data components, which the system employs in the attempt to achieve both Objectives 1 and 2.

FIG. 5 details the set of inputs, Zin 500, that place the victim software application in either the Vulnerable state, in which Objective 1 is met, or the Exploited state, in which Objective 2 is met. The Vin set could be contained within Variable definition 510 or Data Imports 520, i.e., and entire file is read in as an input to the victim application. Both EXin 160' and the malicious op-code 170' are categories as Data Imports 520.

Figure 6:
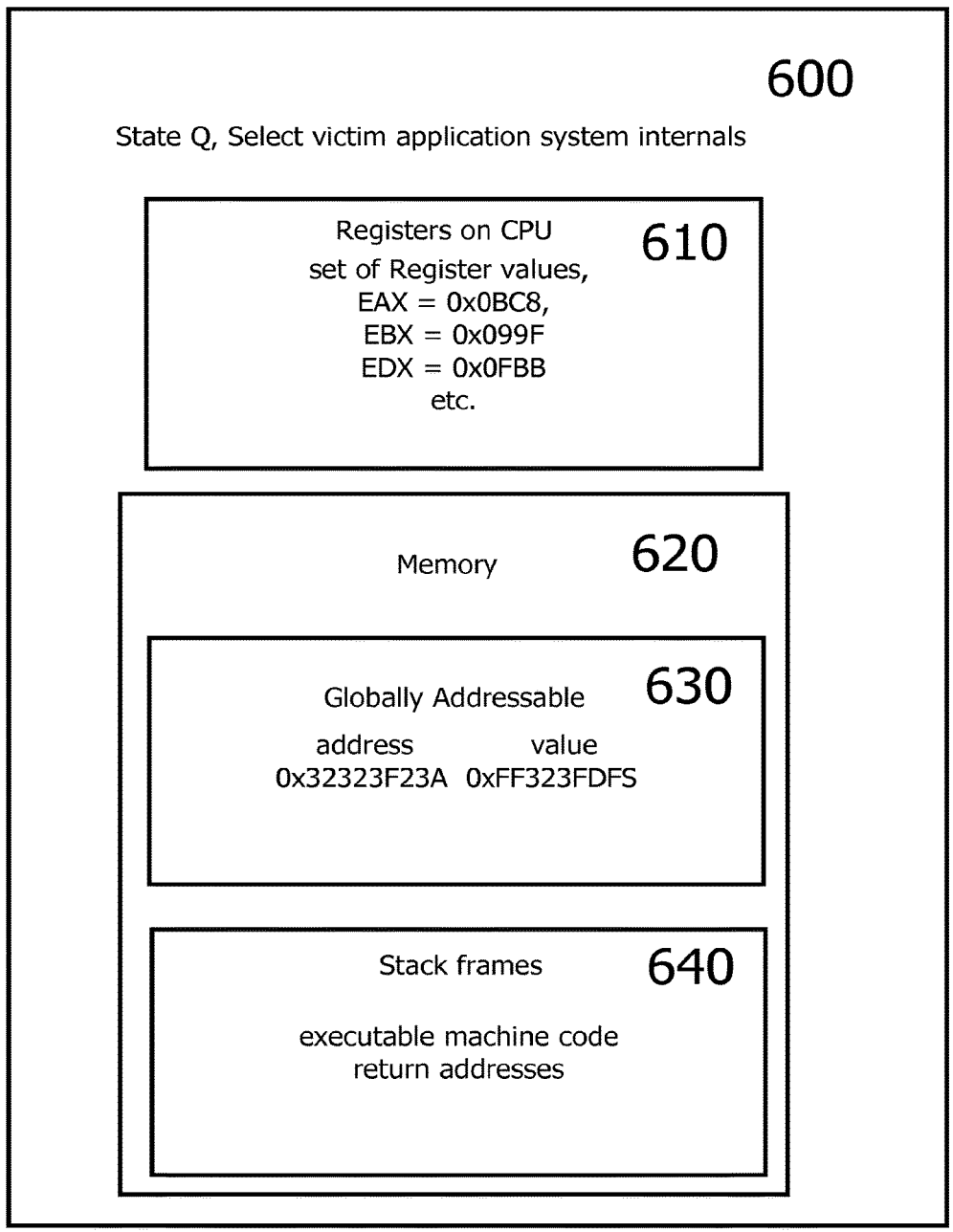
FIG. 6 is an illustration of selected portions and states of the system internals, e.g., CPU register values and memory contents, of the victim software.

FIG. 6 illustrates the state of the CPU and memory internals of a victim application 600. The registers 610 on the CPU are constantly monitored. The memory 620 is further divided into a Globally Addressable section 630 and the Stack Frames 640.

Figure 7:
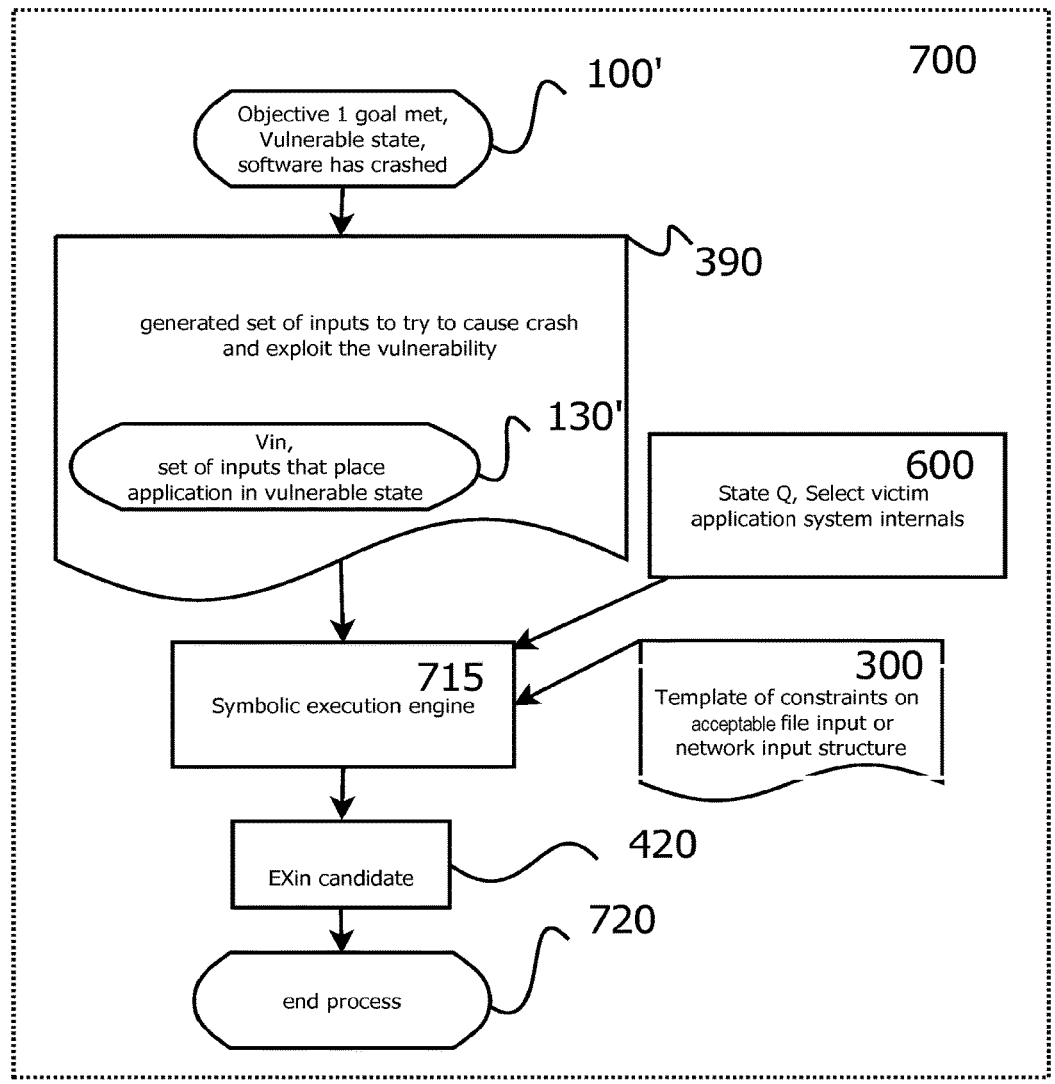
FIG. 7 is a detailed illustration of the Symbol execution engine that is employed to attempt to achieve Objective 2.

FIG. 7 illustrates the process in which the EXin 420 candidates are created. First the process begins when Objective 1 has been met 100', the victim software is in the Vulnerable state. Next the set of inputs that attempt to place the victim software in the Vulnerable and Exploited state 390, which include inputs Vin 130', and are passed to the Symbolic execution engine 715. Also all information from State Q 600, the victim software's system internals, are passed as an input. The output is the EXin candidate 420, which is the data that attempts to Exploit the Vulnerability, thus attempting to meet Objective 2. Lastly, the process ends 720.

The Symbolic execution engine 715 analyses the inputs 390, the template of constraints upon the inputs 300, State Q 600, and Vin which is encompassed within a template generated by the Monte Carlo run 390, to generate an EXin candidate. By converting op-code to symbolic logic, predicate calculus can be employed to determine, given inputs 390 and State Q 600, what set of data EXin 420 would result in the victim software entering the Exploited state 200.

Figure 8:
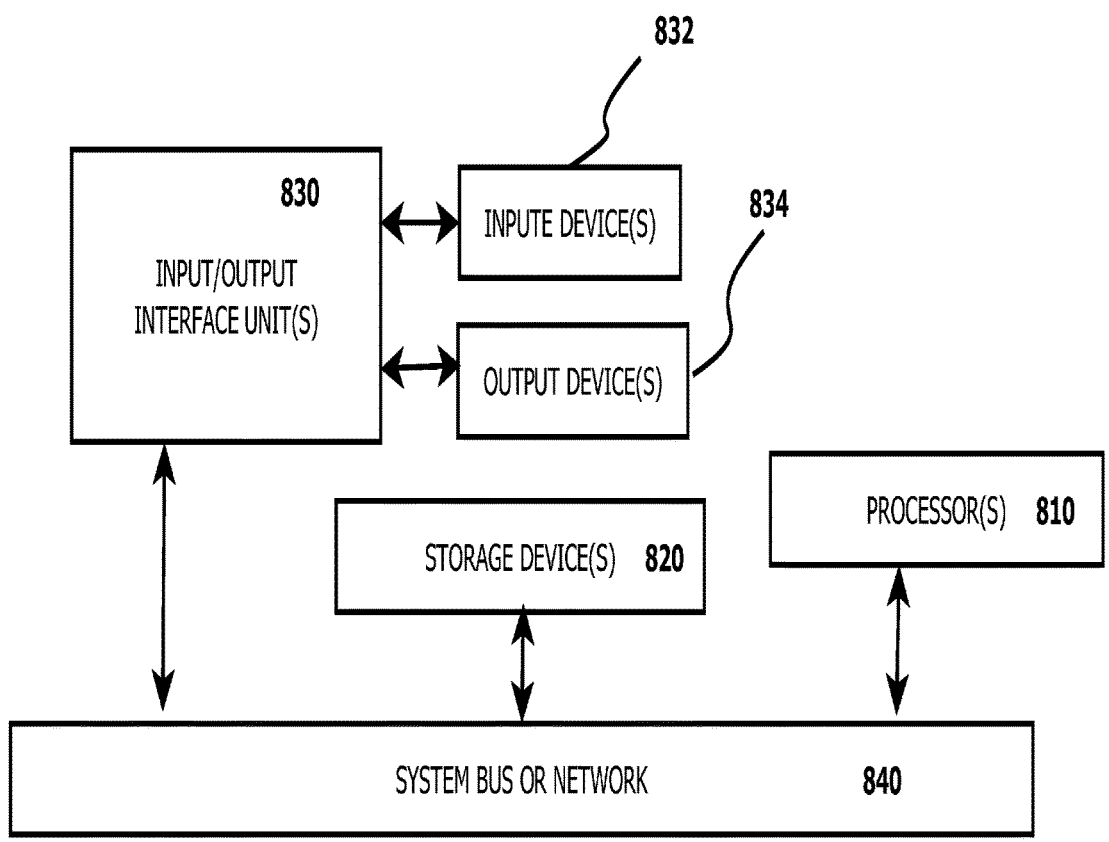
FIG. 8 is a diagram of an exemplary apparatus that may perform various operations in a manner consistent with the invention.

FIG. 8 is a high level diagram of a machine that may perform one or more of the operations discussed above. The machine may be a personal computer, cell phone, or any machine capable of accessing a server and which includes one or more processors 810, storage devices 820, one or more input/output interface unites 830, and one or more system buses and/or networks 840 for facilitating the communication of information among the coupled elements. The machine must also contain one or more input devices 832 and one or more output devices 834 that may be coupled with the one or more input/output interfaces 830. The output devices 834 may include a monitor or cell phone display screen or other type of display device, which may also be connected to the system bus 840 via an appropriate interface. The processors 810, may execute any number of possible operating systems, including but not limited to Linux, Solaris, Windows-based, Android, iOS, webOS, and any other operating system capable of supporting a web-browser either on a cell phone, personal computer, server, or web-enabled television.

What is claimed is:

1. A computer-implemented method for automatically discovering vulnerabilities in computer software, and automatically generating exploits of the vulnerabilities using only a binary executable, the method comprising the steps of:

creating a set of inputs using a Monte Carlo simulation based on a template that adheres to constraints placed upon the set of inputs, said template defines an acceptable range of values and positions of data for the set of inputs, providing the set of inputs to a computer system to cause the computer system entering a vulnerability state, wherein the step of the computer system executing a victim software to enter the vulnerability state comprises at least one input of the set of inputs cause the computer system to execute unauthorized instructions, wherein at least one input is stored within at least one of the computer memory contents or CPU register;

analyzing the CPU register and computer memory contents during normal operation, wherein normal operation is operation of the computer system prior to the vulnerability state;

analyzing the CPU register and computer memory contents after the vulnerability state, wherein the at least one input is identified;

discovering, by the computer system consisting of a plurality of processors or processor cores, the set of inputs that causes the computer that executes a victim software to enter the vulnerability state based on the analyzing, wherein one or more algorithms identifies at least one input from the set of inputs that expose a vulnerability;

generating, by the computer system, exploits of the vulnerability, in response to a vulnerability state being identified, said generating comprises creation of malicious code which executes upon the computer system in the vulnerable state, and:

implementing a feedback loop to use the initial set of inputs to create another set of inputs that are exploits of the vulnerability to cause the execution of malicious code which executes upon the computer system in the vulnerable state and transitions the computer system to the exploited state;

translating binary machine code to a form that carries logic then executing that logic to create exploits of the vulnerability that transitions the computer system from the vulnerable state to the exploited state;

determining through the use of symbolic execution a set of inputs to cause the computer system to transition from the vulnerable state to the exploited state by moving program counter to point of control caused by vulnerability to embedded malicious op-code;

determining a set of input that allows execution of the embedded malicious opcode through symbolic execution to transition computer system from a vulnerable state to an exploited state through the detection of input data in a CPU register or memory location; and providing a probability value with a confidence interval for the set of inputs.

2. The method of claim 1 wherein a coverage map of potential vulnerabilities is examined.

3. The method of claim 2 wherein the Monte Carlo simulations generates a plurality of inputs with a goal of discovering a vulnerability.

4. The method of claim 3 wherein the inputs contain malicious code and the exploit.

5. The method of claim 4 wherein a use of symbolic logic execution for the determination of a predicate calculus solution to determine what inputs to a victim software execution would result in the CPU's program counter to execute malicious code given a set of CPU system internals that include CPU register values and memory values with a goal of creating an exploit of the victim software that would execute malicious code.

6. A method for automatically discovering vulnerabilities in computer software and automatically generating exploits of the vulnerabilities using only a binary executable, the method comprising the steps of:

creating a set of inputs using a Monte Carlo simulation based on a template that adheres to constraints placed upon the set of inputs, said template defines an acceptable range of values and positions of data for the set of inputs, providing the set of inputs to a high performance distributed computing environment having at least one processor and at least one storage device storing processor-executable instructions discovering a set of inputs that cause the computer that executes a victimized software to cause the computer system executing a victim software to enter a vulnerability state, wherein at least one input of the set of inputs causes the computer executing a victim software to enter the vulnerability state, wherein the one or more algorithms identifies at least one input from the set of inputs that expose the vulnerability;

generating, by the high performance distributed computing environment, exploits of the vulnerability, in response to a vulnerability state being identified, said generating comprises creation of malicious code which executes upon the computer system in the vulnerable state and:

implementing a feedback loop to use the initial set of inputs to create another set of inputs that are exploits of the vulnerability to cause the execution of malicious code which executes upon the computer system in the vulnerable state and transitions the computer system to the exploited state;

translating binary machine code to a form that carries logic then executing that logic to create exploits of the vulnerability that transitions the computer system from the vulnerable state to the exploited state;

determining through the use of symbolic execution a set of inputs to cause the computer system to transition from the vulnerable state to the exploited state by moving program counter to point of control caused by vulnerability to embedded malicious op-code;

determining a set of input that allows execution of the embedded malicious opcode through symbolic execution to transition computer system from a vulnerable state to an exploited state through the detection of input data in a CPU register or memory location; and providing a probability value with a confidence interval for the set of inputs.

7. The method of claim 6 wherein a coverage map of potential vulnerabilities is examined.

8. The method of claim 6 wherein a Monte Carlo simulation generates a plurality of inputs with a goal of discovering a vulnerability.

9. The method of claim 6 wherein the inputs contain malicious code in addition to the exploit.

10. The method of claim 6 wherein a use of symbolic logic execution for the determination of a predicate calculus solution to determine what inputs to a victim software execution would result in the CPU's program counter to execute malicious code given a set of CPU system internals that include CPU register values and memory values with a goal of creating an exploit of the victim software that would execute malicious code.

* * * * *